(12) United States Patent
Pechanek et al.

(10) Patent No.: US 9,063,722 B2
(45) Date of Patent: *Jun. 23, 2015

(54) METHODS AND APPARATUS FOR INDEPENDENT PROCESSOR NODE OPERATIONS IN A SIMD ARRAY PROCESSOR

(75) Inventors: Gerald George Pechanek, Cary, NC (US); Edwin Franklin Barry, Vilas, NC (US); Mihailo Stojancic, San Jose, CA (US)

(73) Assignee: Altera Corporation, San Jose, CA (US)

( * ) Notice: Subject to any disclaimer, the term of this patent is extended or adjusted under 35 U.S.C. 154(b) by 707 days.

This patent is subject to a terminal disclaimer.

(21) Appl. No.: 13/332,482

(22) Filed: Dec. 21, 2011

(65) Prior Publication Data

US 2012/0131310 A1    May 24, 2012

Related U.S. Application Data

(60) Division of application No. 12/758,758, filed on Apr. 12, 2010, now Pat. No. 8,103,854, which is a continuation of application No. 11/736,814, filed on Apr. 18, 2007, now Pat. No. 7,730,280.

(60) Provisional application No. 60/813,915, filed on Jun. 15, 2006.

(51) Int. Cl.
*G06F 9/38* (2006.01)
*G06F 9/30* (2006.01)
*G06F 9/32* (2006.01)
*G06F 15/80* (2006.01)

(52) U.S. Cl.
CPC ............... *G06F 9/3009* (2013.01); *G06F 9/32* (2013.01); *G06F 9/3802* (2013.01); *G06F 9/3851* (2013.01); *G06F 9/3853* (2013.01); *G06F 9/3885* (2013.01); *G06F 9/3887* (2013.01); *G06F 9/3889* (2013.01); *G06F 15/8007* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,239,654 A * | 8/1993 | Ing-Simmons et al. | ......... | 712/20 |
| 5,475,856 A * | 12/1995 | Kogge | ............................ | 712/20 |
| 6,272,616 B1 * | 8/2001 | Fernando et al. | ............... | 712/20 |
| 6,366,998 B1 * | 4/2002 | Mohamed | ........................ | 712/17 |
| 6,874,078 B2 * | 3/2005 | Pechanek et al. | ................ | 712/24 |
| 2004/0230975 A1* | 11/2004 | Gewirtz et al. | ................ | 718/100 |
| 2005/0055594 A1* | 3/2005 | Doering et al. | ................ | 713/375 |
| 2006/0004988 A1* | 1/2006 | Jordan | ............................ | 712/43 |

* cited by examiner

*Primary Examiner* — Eric Coleman
(74) *Attorney, Agent, or Firm* — Law Offices of Peter H. Priest, PLLC

(57) ABSTRACT

A control processor is used for fetching and distributing single instruction multiple data (SIMD) instructions to a plurality of processing elements (PEs). One of the SIMD instructions is a thread start (Tstart) instruction, which causes the control processor to pause its instruction fetching. A local PE instruction memory (PE Imem) is associated with each PE and contains local PE instructions for execution on the local PE. Local PE Imem fetch, decode, and execute logic are associated with each PE. Instruction path selection logic in each PE is used to select between control processor distributed instructions and local PE instructions fetched from the local PE Imem. Each PE is also initialized to receive control processor distributed instructions. In addition, local hold generation logic is associated with each PE. A PE receiving a Tstart instruction causes the instruction path selection logic to switch to fetch local PE Imem instructions.

20 Claims, 7 Drawing Sheets

Thread start (Tstart): Encoding

| 31 30 | 29 | 28 27 26 25 | 24 23 | 22 | 21 20 19 18 17 16 15 14 13 12 11 10 | 9 8 7 6 5 4 3 2 1 0 |
|---|---|---|---|---|---|---|
| Group | S/P=1=PE | CtrlOp 1011 | Ctrl | T=1 | Reserved | Thread Block Number |

Thread stop (Tstop): Encoding

| 31 30 | 29 | 28 27 26 25 | 24 23 | 22 | 21 20 19 18 17 16 15 14 13 12 11 10 9 8 7 6 5 4 3 2 1 0 |
|---|---|---|---|---|---|
| Group | S/P=1=PE | CtrlOp 1011 | Ctrl | T=0 | Reserved |

METHODS AND APPARATUS FOR INDEPENDENT PROCESSOR NODE OPERATIONS IN A SIMD ARRAY PROCESSOR

RELATED APPLICATION

The present Application for Patent claims benefit of, and is, a divisional of U.S. patent application Ser. No. 12/758,758 entitled "METHODS AND APPARATUS FOR INDEPENDENT PROCESSOR NODE OPERATIONS IN A SIMD ARRAY PROCESSOR" filed Apr. 12, 2010 now U.S. Pat. No. 8,103,854, by the same inventors which is a continuation of U.S. patent application Ser. No. 11/736,814 entitled "METHODS AND APPARATUS FOR INDEPENDENT PROCESSOR NODE OPERATIONS IN A SIMD ARRAY PROCESSOR" filed Apr. 18, 2007, which issued as U.S. Pat. No. 7,730,280, by the same inventors which is a non-provisional of Provisional Application No. 60/813,915 "METHODS AND APPARATUS FOR INDEPENDENT PROCESSOR NODE OPERATIONS IN A SIMD ARRAY PROCESSOR" filed Jun. 15, 2006, by the same inventors—the above applications are hereby incorporated herein by reference in their entirety.

FIELD OF THE INVENTION

The present invention relates generally to improvements in parallel data processing architectures for video processing and more particularly to apparatus and methods for independent processor node operations in a single instruction multiple data (SIMD) array processor.

BACKGROUND OF THE INVENTION

Increasing demand for high definition TV products, including interactive TV in a HD format and HD video compression encoding and decoding, requires increasing sophistication, flexibility, and performance in the supporting electronics. The sophistication, flexibility, and performance requirements for HD TV exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video encoding standards, such as MPEG-2, H.264, and SMPTE-VC-1. Motion estimation/compensation and deblocking filtering are two examples of general algorithms that are required for video encoding. To efficiently support motion estimation algorithms and other complex programmable functions which may vary in requirements across the multiple standards, a processor by itself would require significant parallelism and very high clock rates to meet the requirements. A processor of this capability would be difficult to develop in a cost effective manner for commercial products.

Two primary parallel programming models, the SIMD and the MIMD models are typically used in commercial parallel processors. In the SIMD model, a single program thread controls multiple processing elements (PEs) in synchronous lock-step operation. Each PE executes the same instruction but on different data. This is in contrast to the MIMD model where multiple program threads of control exist and any inter-processor operations must contend with the latency to synchronize the independent program threads prior to communicating. The problem with SIMD is that not all algorithms can make efficient use of the available parallelism existing in the processor. The amount of parallelism inherent in different algorithms varies leading to difficulties in efficiently implementing a wide variety of algorithms on SIMD machines. The problem with MIMD machines is the latency of communications between multiple processors leading to difficulties in efficiently synchronizing processors to cooperate on the processing of an algorithm. Typically, MIMD machines also incur a greater cost of implementation as compared to SIMD machines, since each MIMD PE must have its own instruction sequencing mechanism which can amount to a significant amount of hardware. MIMD machines also have an inherently greater complexity of programming control required to manage the independent parallel processing elements. Consequently, levels of programming complexity and communication latency occur in a variety of contexts when parallel processing elements are employed. It will be highly advantageous to efficiently address such problems as discussed in greater detail below.

SUMMARY OF THE INVENTION

In one or more of its several aspects, the present invention addresses problems such as those described above. In one of its aspects, the present invention describes an apparatus that allows improvements in processor node capability in a SIMD array processor.

An embodiment of the present invention addresses an apparatus for parallel processing. A control processor is used for fetching and distributing single instruction multiple data (SIMD) instructions to a plurality of processing elements (PEs), wherein one of the SIMD instructions is a thread start (Tstart) instruction which causes the control processor to pause its instruction fetching. A local PE instruction memory (PE Imem) is associated with each PE and contains local PE instructions for execution on the local PE. Local PE Imem fetch, decode, and execute logic are associated with each PE. Instruction path selection logic in each PE is used to select between control processor distributed instructions and local PE instructions fetched from the local PE Imem. Each PE is also initialized to receive control processor distributed instructions. In addition, local hold generation logic is associated with each PE. A PE receiving a Tstart instruction causes the instruction path selection logic to switch to fetch local PE Imem instructions.

Another embodiment of the present invention addresses a method of enabling multiple instruction multiple data (MIMD) operations in a single instruction multiple data (SIMD) array processor. Receiving a thread start (Tstart) instruction in a control processor and in a plurality of enabled processing elements (PEs). Generating a hold signal in the control processor based on the Tstart instruction to pause the control processor from fetching and distributing instructions to the PEs. Switching instruction paths in each PE to a local PE instruction memory (PE Imem) path in response to the Tstart instruction received in each enabled PE. In addition, fetching instructions from the local PE Imem independently in each PE for execution locally on each PE.

Another embodiment of the present invention addresses a method for executing very long instruction words (VLIWs) separately on individual processing elements (PEs). Receiving a thread start (Tstart) instruction in a control processor and in a plurality of enabled processing elements (PEs). Generating a hold signal in the control processor based on the Tstart instruction to pause the control processor from fetching and distributing instructions to the PEs. Switching instruction paths in each PE to a local PE instruction memory (PE Imem) path based on in response to the Tstart instruction received in each enabled PE. In addition, fetching a PE execute VLIW (PEXV) from the local PE Imem and executing the PEXV instruction separately on the PE that fetched the PEXV instruction.

These and other features, aspects, techniques, and advantages of the present invention will be apparent to those skilled in the art from the following detailed description, taken together with the accompanying drawings and claims.

BRIEF DESCRIPTION OF THE DRAWINGS

FIG. 2B illustrates an exemplary thread start (Tstart) instruction format, in accordance with the present invention;

FIG. 2C illustrates an exemplary thread stop (Tstop) instruction format in accordance with the present invention;

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Further details of attaching an application specific hardware assist function within an array processor for use in conjunction with the present invention is found in U.S. Provisional Application Ser. No. 60/795,140 entitled "Methods and Apparatus for Attaching Application Specific Functions Within an Array Processor" filed Apr. 26, 2006 and incorporated by reference herein in its entirety.

Figure 1:
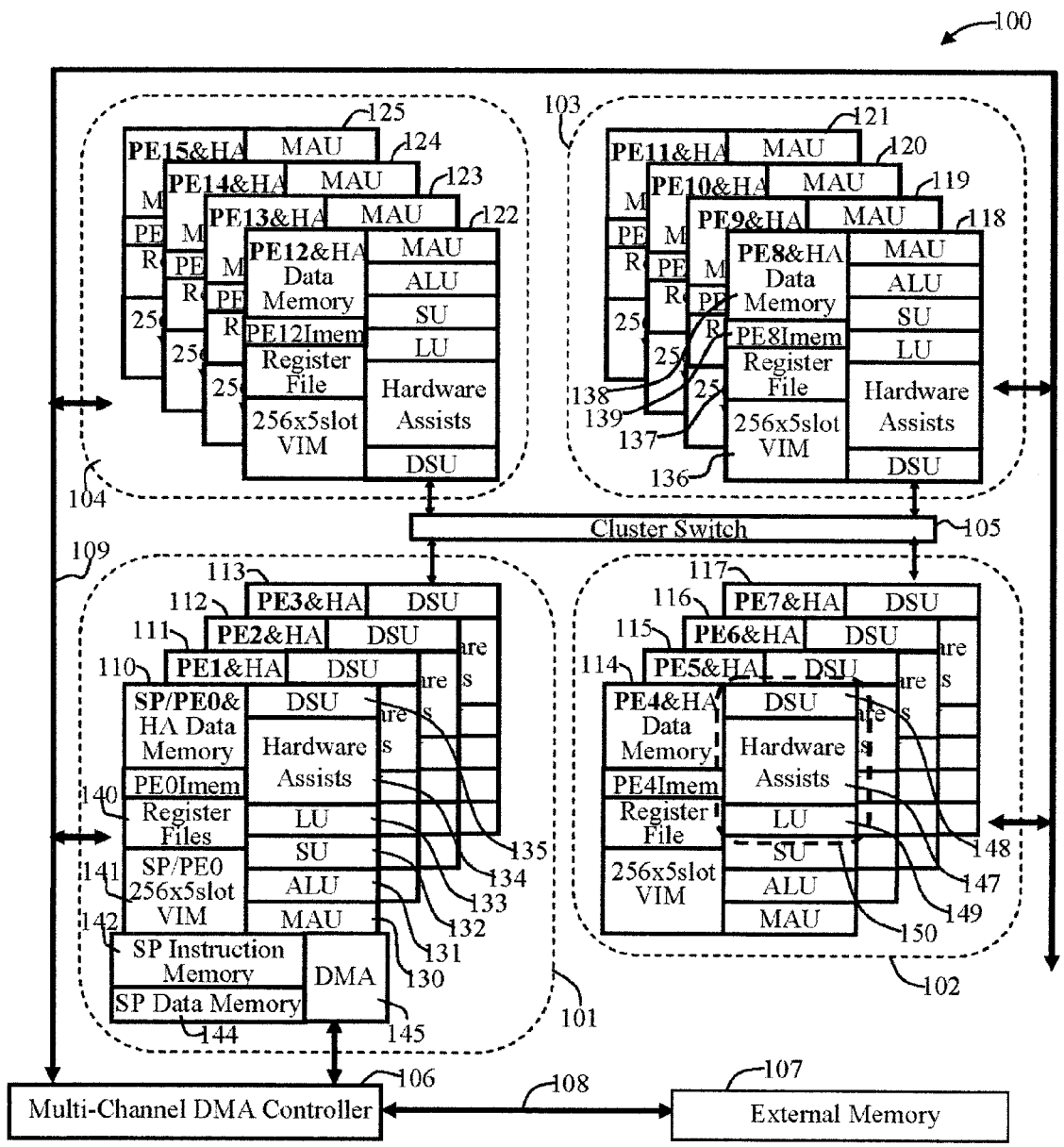
FIG. 1 illustrates a sixteen node video signal processor (VSP$_{16}$) in accordance with one or more embodiments of the present invention.

FIG. 1 illustrates a sixteen-node video signal processor (VSP$_{16}$) 100 in accordance with one or more embodiments of the present invention. The VSP$_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109. Generally, the PEs are organized in an N×N array, for example, as a N=4 4×4 array of PEs as shown in FIG. 1.

A controlling function sequence processor (SP) combined with processing element zero (PE0) functions is indicated as SP/PE0 110. The SP/PE0 shares execution units between the SP control function and the PE0 data processing function. To support the SP and PE0, a separate SP register file and a separate PE0 register file are used. The two separate register files are indicated with one block as an (SP/PE) register file 140 that is used to maintain the processing context of the SP and PE0.

SP/PE0 110 and fifteen additional processor engines (PEs) 111-125 are partitioned in groups of four PEs per cluster as a 4×4 array organization. Each PE provides programmable processing and hardware assist functions. SP/PE0 110 is unique as compared to the other fifteen PEs 111-125, having an array controlling function combined with the PE function of PE0. The common features of the sixteen PEs 110-125 include a set of instruction execution units including, for example for PE0, a multiply accumulate unit (MAU) 130, an arithmetic logic unit (ALU) 131, a store unit (SU) 132, a load unit (LU) 133, a hardware assist (HA) 134, a data select unit (DSU) 135, and for example for PES, a 256×5 slot very long instruction word memory (VIM) 136, a local PE register file 137, a data memory 138 local to each PE and HA, and a local PE instruction memory (PE#Imem) 139 in accordance with the present invention and as described in more detail below. Each PE also contains local pipeline controls, decode logic, and control logic appropriate for each PE. All VSP$_{16}$ instructions are executed in a simple pipeline with a majority of instructions requiring a single execution stage and a few instructions requiring two execution stages that are pipelined.

To control the VSP$_{16}$ the SP generally has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching and issuing of instructions such as load VLIW and execute VLIW instructions. Though not limited to this, the SP/PE0 shares a single VIM 141. The load VLIW instruction may be an SP only instruction or a PE instruction that is broadcast to all the PEs. The Load VLIW instruction provides an indirect VIM address and is used to load the instruction slots at the specified VIM address. The execute VLIW instruction may also be an SP only instruction or a PE instruction that is broadcast to all the PEs. The execute VLIW instruction causes a VLIW to be selected at a specified indirect VIM address and executed.

The single SP thread of control supports 4×4 single instruction multiple data (SIMD) sub-threads which operate synchronously in lock step SIMD fashion. Each SIMD sub-thread uses very long instruction words (VLIWs) which are indirectly selected and executed by the single SP thread. Each VLIW in each PE at the same VIM address may be different. All unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 640 instruction specified operations per cycle. As an example of the processing power this provides, a VSP$_{16}$ operating at 250 Mhz may achieve 160 Giga operations per second.

The single SP thread of control also enables 4×4 multiple Instruction multiple data (MIMD) independent program threads which operate on the PEs. Once the SP enables the MIMD threads, each PE independently fetches instructions from a local PE Imem for local execution until a local PE stop instruction is fetched from the local PE Imem, as described in further detail below.

The $VSP_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation and other high compute functions, a hardware assist (HA) unit with advantageous independent connections to local PE memory is provided. A HA unit has one or more multi-cycle tightly coupled state machine functions which provide memory intensive application specific operational capability to each of the PEs in the $VSP_{16}$. For example, HA unit 147 interfaces with DSU 148 and LU 149 and the local data memory associated with PE4 114 as a transform engine 150.

Figure 2A:
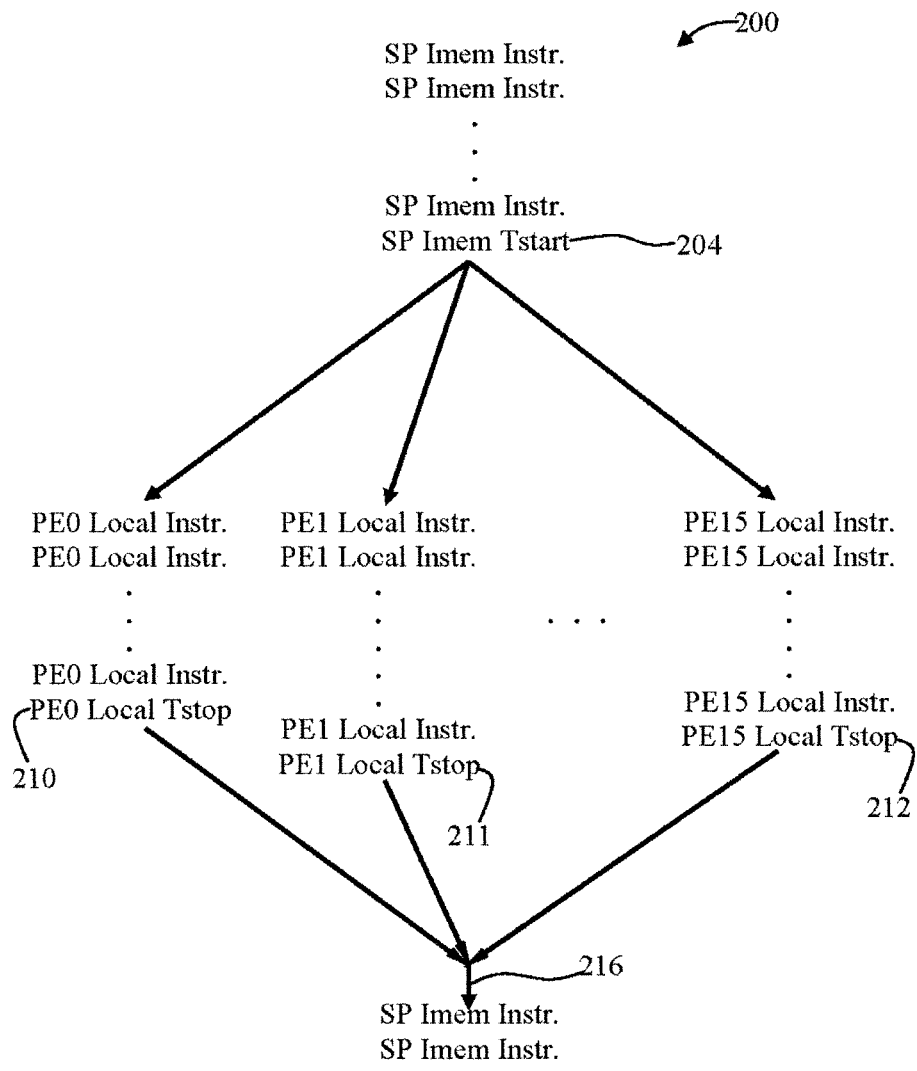
FIG. 2A illustrates a scalable thread flow chart of independent thread operations for the VSP$_{16}$ in accordance with the present invention.

FIG. 2A illustrates a scalable thread flow chart 200 of independent and scalable thread operations for the $VSP_{16}$. The SP controls the thread operation by issuing a thread start (Tstart) instruction 204 as illustrated in FIG. 2B. The Tstart instruction is fetched from SP instruction memory 142 and dispatched to the SP and generally to all enabled PEs. Upon receiving the Tstart instruction, a pre-decode pipeline stage determines that the instruction is a Tstart instruction and causes a SP-hold signal to be initiated. The SP-hold signal causes the SP to pause operations, enter a hold state, and stop fetching instructions. Each enabled PE switches to local independent PE operations. The local independent PE operations begin with fetching PE local instructions from PE instruction memory as described in more detail below. The PE instruction memory may store all types of PE instructions including a new type of PE control instruction that provide branching capabilities to each local PE and a thread stop (Tstop) instruction. As shown in FIG. 2A, each PE operates independently until its operations are complete, at which point each PE fetches a Tstop instruction 210-212. A Tstop instruction causes local PE-hold signals to be generated, stops the PE from fetching local PE instructions, and causes the PE to enter a local PE hold state. Since each PE operations are independent, each PE will generally have a different timing as to when it enters the PE hold state. Once all PEs have completed their local independent operations, the SP-hold signal is released, all PE local hold signals are released, and the SP continues with its fetching operation 216 from which it was paused. Depending upon the application, the SP pause may be allowed to be interrupted with suitable controls in place to, for example, pause the local independent PE operations while an interrupt is serviced. In one alternative, the SP pause may not be interrupted and, in this case, interrupts would be held pending until the SP is released back to its normal operation.

FIG. 2B illustrates an exemplary thread start (Tstart) instruction format 250. In this exemplary format 250, a group field 251 indicates this is a control instruction, a S/P bit 252 set to a 1 indicates this is a PE control instruction, a control opcode (CtrlOp) 253 set to a 1011 indicates this is a thread instruction, a control (Ctrl) field 254 is reserved as an opcode extension field, a T-bit field 255 set to a 1 is used to indicate the instruction is to be interpreted as a Tstart instruction. In addition, a reserved bit field 257 is available for future use in encoding thread parameters, for example. As an example of a thread parameter, a thread block number field 259 is encoded in bits 0-9 of the Tstart instruction format.

FIG. 2C illustrates an exemplary thread stop (Tstop) instruction format 275. The group, S/P, and CtrlOp bit fields 270 may be the same as the corresponding bit fields 251, 252, and 253, respectively, of the Tstart instruction format 250. The control (Ctrl) field 277 is reserved as an opcode extension field, a T-bit field 278 set to a 0 is used to indicate the instruction is to be interpreted as a Tstop instruction. In addition, a reserved bit field 279 is available for future use in encoding thread parameters or provide other control bits, for example.

Generally, multiple blocks of code may be executed by each PE with each block of code beginning with a Tstart instruction and ending with the last PE completing its own local block operations. Each PE receives notification of which block to execute. This notification may be determined locally in each PE or by the parameter thread block number field 259 FIG. 2B passed by the Tstart instruction. Reserved fields 257 and 279 in FIGS. 2B and 2C are maintained in the Tstart and Tstop instructions for future use.

Figure 3:
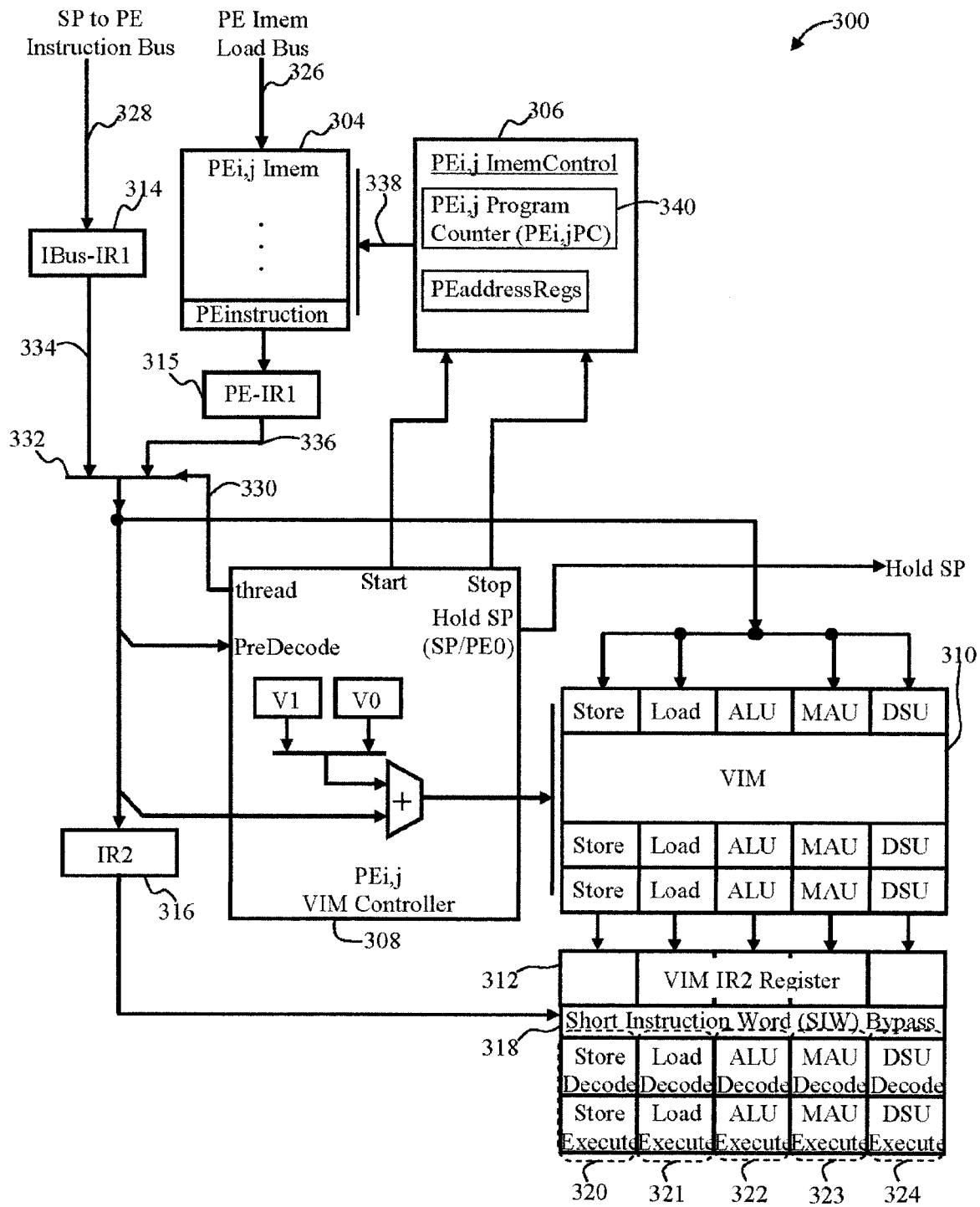
FIG. 3 illustrates a PE block diagram 300 focusing on a selectable independent local control of instruction sequencing in accordance with the present invention.

FIG. 3 illustrates a PE block diagram 300 focusing on a selectable independent local control of instruction sequencing. The PE contains a local Imemory (Imem) 304, a $PE_{ij}$ Imem controller 306, a VIM controller 308, a VIM 310, a VIM IR2 register 312, an instruction bus instruction register 1 (IBus-IR1) 314, a PE instruction register 1 (PE-IR1) 315, a multiplexer 332, an instruction register 2 (IR2) 316, a short instruction word (SIW) bypass unit 318, and instruction decode and execute units 320-324. It is noted that other aspects of a PE, such as, a hardware assist unit, a data memory, a register file, DMA paths, and the like, are not shown in FIG. 3 for reasons of clarity in illustrating the selectable independent local control of instruction sequencing. The local PE Imem 304 holds PE single instructions which can be store, load, ALU, MAU, and DSU short instruction words (SIWs) as well as unique PE control instructions. PE branch type instructions, PE execute VLIWs (PEXVs), and load VLIWs (LVs) instructions can be stored into each local PE Imem. PE instructions may be loaded into the PE Imem 304 over a PE Imem load bus 326 from a DMA path or from local PE memory. In one embodiment of the present invention, PE local Imems may be loadable using PE store special purpose register instructions (SSPR.Ps), which identifies a memory port in special purpose register (SPR) space. With this approach, the PE local Imems could all be loaded from their local data memories in parallel. The local data memories would be loaded with the local Imem contents by the DMA engines. Two SPR addresses would be needed, one to set the start address for instruction loads, the other acts as a data port. For example:

```
SSPR.P R0, IMEM_ADDR  // stores starting I-Mem address
SSPR.P RI, IMEM_INST  // stores inst to address, IMEM_ADDR is
                      // incremented automatically in hardware
LII R1, A0+, 1        // get next inst from PE local data mem
```

Putting the SSPR and load indirect with scaled immediate update (LII) instructions in a VLIW would allow single cycle loading of all PE I-Mems simultaneously.

In another embodiment of the present invention, the PE local Imems may be directly loaded by the DMA engines. A two port Imem would be used having a read port for use by the local PE to fetch instructions and a write port for use by a DMA engine to load instructions.

The PEs power on into a SIMD PE state of operation with the SP dispatching instructions to the SP and PEs on an SP to PE instruction bus 328. A thread signal 330 causes multiplexer 332 to select the IBus-IR1 signal path 334. When a Tstart instruction is received from the SP, it is predecoded causing the thread signal 330 to change state and each PE switches from a SIMD operating state to PE local operations. The thread signal 330 in the switched state causes multiplexer 332 to select the PE-IR1 signal path 336 beginning PE local operations. In PE local operations, each PE begins to select instructions from the PE local Imem 304 by generating fetch addresses 338 based on the contents of a processing element i,j program counter (PEi,jPC) 340. The SP enters a pause state such that the SP cannot send further instructions to the PEs until the pause state is removed. Rather the PEs execute their own independent instruction stream. At the completion of all the local PE tasks, the SP-hold signal is switched to an inactive state which releases the SP. The SP then resumes instruction fetch and dispatch operations. The PEs wait for the SP to send an instruction to the PE, which may be a PE instruction or another Tstart instruction.

Figure 4A:
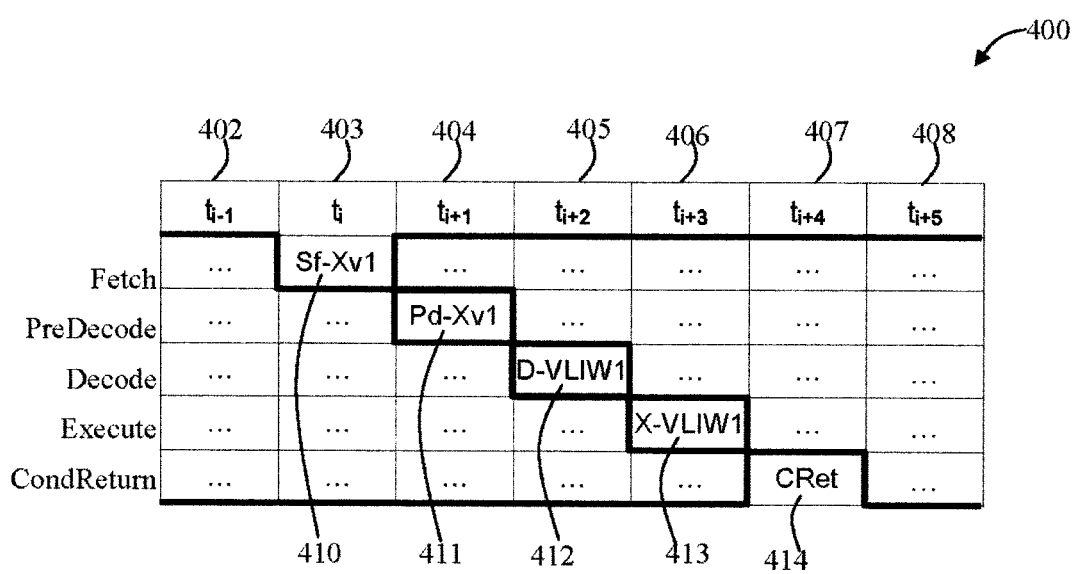
FIG. 4A illustrates a VSP$_{16}$ general SIMD pipeline in accordance with the present invention.

FIG. 4A illustrates a $VSP_{16}$ in general SIMD pipeline 400. The SIMD pipeline 400 is shown with time periods $t_{i-1}$ 402, $t_i$ 403, $t_{i+1}$ 404, $t_{i+2}$ 405, $t_{i+3}$ 406, $t_{i+4}$ 407, and $t_{i+5}$ 408. The SP fetches and distributes a PE execute VLIW Instruction (Sf-Xv1) 410 from SP instruction memory in $t_i$ 403. In $t_{i+1}$ 404, a predecode operation (Pd-Xv1) 411 determines a VLIW is to be fetched from local VIM, such as VIM 310 of FIG. 3. In $t_{i+2}$ 405, a decode operation (D-VLIW1) 412 decodes a VLIW1 fetched from the local VIM. In $t_{i+3}$ 406, the VLIW1 is executed (X-VLIW1) 413. In $t_{i+4}$ 407, conditions generated by the execution of the VLIW1 are returned (CRet) 414.

Figure 4B:
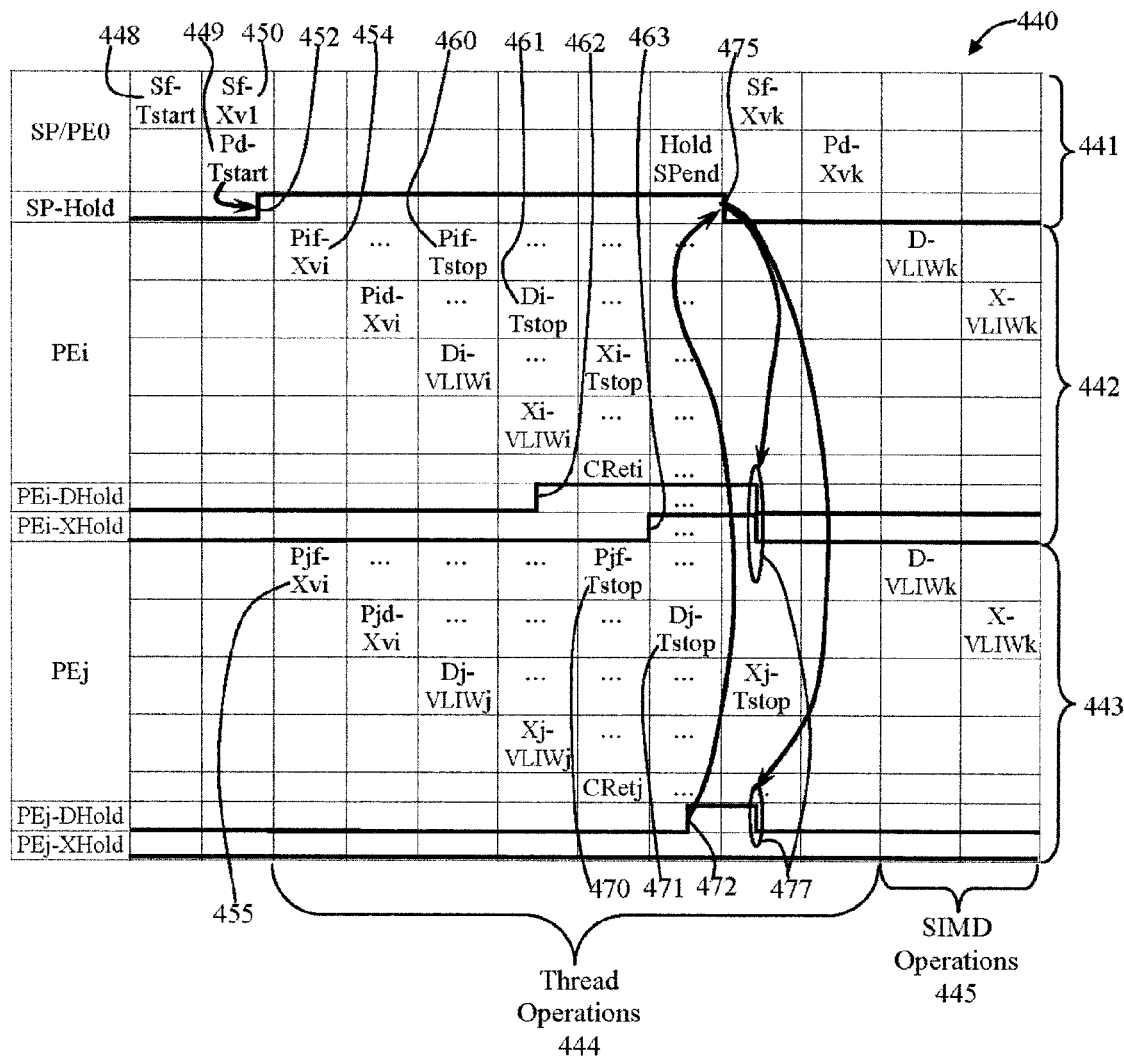
FIG. 4B illustrates thread pipeline operations on an SP and two PEs in accordance with the present invention.

FIG. 4B illustrates thread pipeline operations 440 on an SP and two PEs. The SP pipeline 441, a PEi pipeline 442, and a PEj pipeline 443 illustrate the starting of thread operations 444 and returning to SIMD operations 445. The SP fetches from the SP instruction memory 142 of FIG. 1 a Tstart instruction (Sf-Tstart) 448. The Tstart instruction is also distributed to and received at each enabled PE. The Tstart instruction is predecoded (Pd-Tstart) 449 in the SP while a fetch for the next instruction from SP instruction memory 142 is started (Sf-Xv1) 450. A SP-hold signal is activated at timing event 452 based on the predecoded Tstart instruction.

The Tstart instruction is also predecoded in each of the enabled PEs causing the enabled PEs to be placed in an independent mode of operation. The PEs begin fetching instructions from their local Imems, such as illustrated with PEi fetching an XV instruction (Pif-Xv1) 454 and PEj fetching an XV instruction (Pif-XV1) 455. The pipelines for these instructions continue in a predecode, decode, execute and condition return pipeline stages. PEi completes its local program operations when PEi fetches a Tstop instruction (Pif-Tstop) 460. When the Tstop instruction is predecoded in PEi (Di-Tstop) 461 a PEi decode hold signal (PEi-Dhold) at timing event 462 is activated. The active level of the PEi-Dhold signal 462 stops the PEi from fetching additional PEi instructions. When the PEi executes the Tstop instruction (Xi-Tstop) and generally all instructions in the PE have completed execution, a PEI execute hold signal (PEi-Xhold) is activated at timing event 463. The active level of the PEi-Xhold signal at timing event 463 generally stops all PEi operations. The active level of the PEi-Dhold signal 462 is sent back to the SP to indicate that PEi has started to hold further operations. Depending on pipeline controls and other system considerations, such as a PE instruction not completing execution, the PEi-Dhold signal at timing event 462 may be delayed before being sent back to the SP.

PEj completes its local program operations when PEj fetches a Tstop instruction (Pjf-Tstop) 470. When the Tstop instruction is predecoded in PEj (Dj-Tstop) 471 a PEj decode hold signal (PEj-Dhold) is activated at timing event 472. The active level of the PEj-Dhold signal at timing event 472 stops the PEj from fetching additional PEj instructions. The active level of the PEj-Dhold signal at timing event 472 is sent back to the SP to indicate that PEj is starting to hold further operations. In this example, PEj is the last PE to finish its local program operations. All other PEs that have completed local program operations earlier will have sent a PEx-Dhold signal to the SP. The last PEs, such as PEj, generally completing operations and having sent the PEj-Dhold signal to the SP, the SP having received all PEi-Dhold signals from the enabled PEs deactivates the the SP hold signal at timing event 475. The SP hold signal is distributed to all PEs. With the SP hold signal deactivated, the PEs release their hold signals at timing event 477 which causes the thread signal 330 of FIG. 3 to switch state which enables multiplexer 332 to select the IBus-IR1 314. The PEs wait for a new instruction to be distributed to them from the SP.

To minimize pipeline latencies to switch from the PE local operations back to SP SIMD operations, the Tstop instruction may be architected to execute a number of PE instructions after (in the shadow of) the Tstop instruction. The number of PE instructions to execute may be fixed or determined by a parameter passed in the Tstop instruction.

Figure 5:
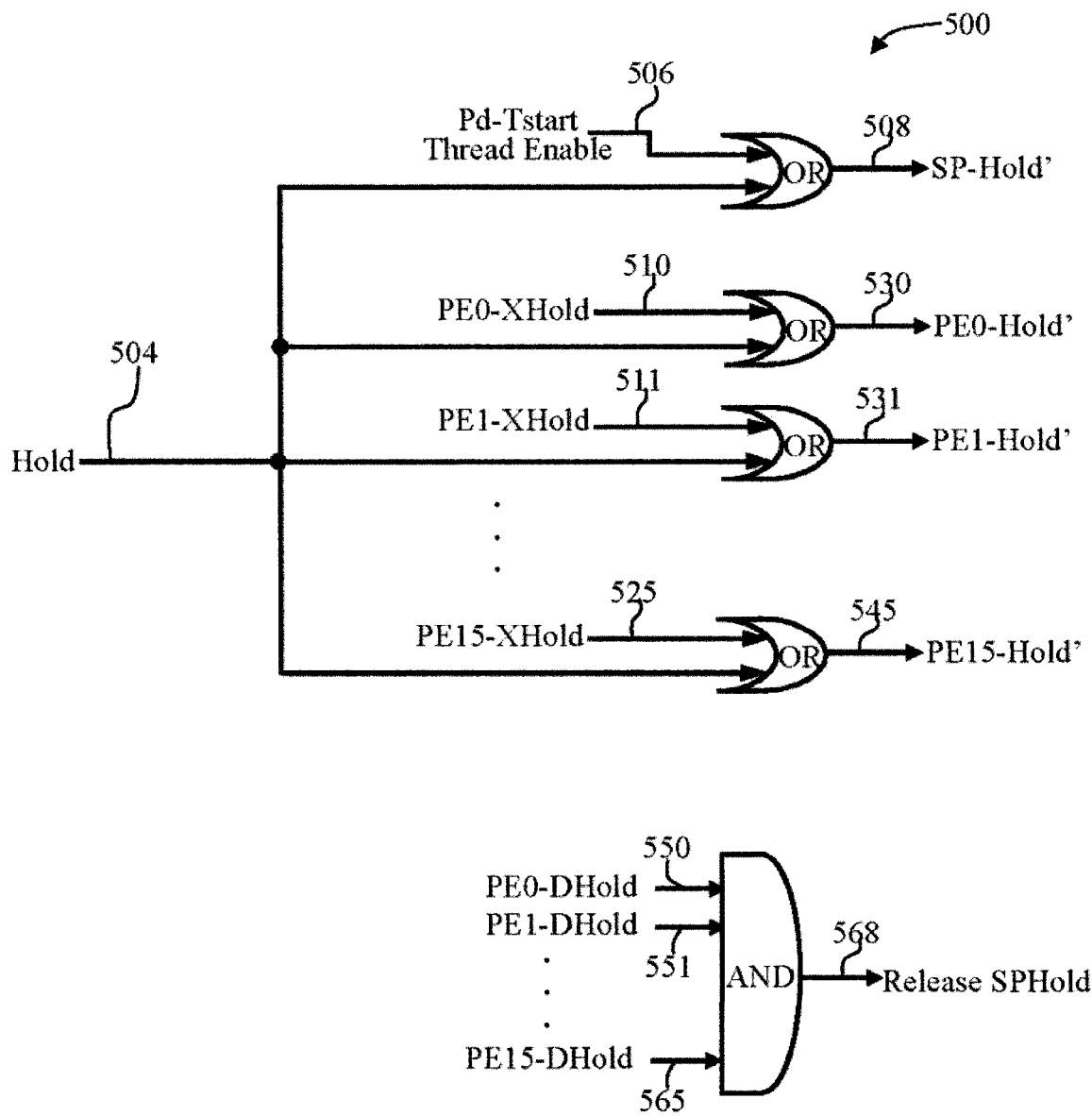
FIG. 5 illustrates exemplary distributed hold signals for an SP and an array of sixteen PEs in accordance with the present invention.

FIG. 5 illustrates exemplary distributed hold signals 500 for an SP and an array of sixteen PEs. A hold signal 504 may be generated, for example, from the SP whenever a fetch operation takes longer than expected to complete. If an instruction fetch is held up for more than one cycle, a hold signal 504 is generated causing the SP and array of PEs to pause pending receipt of the fetched instruction. For PE thread operations, individual hold signals are generated. The SP logically ORs a pre-decode (Pd)-Tstart Thread Enable signal 506 with the hold signal 504 to generate an SP-hold 508. The Pd-Tstart Thread Enable signal 506 is activated upon predecoding a Tstart instruction and deactivated when the SP has received all of the PEs decode hold (PEi-DHold) signals.

Each PE ORs a PEi-execute hold signal (PEi-XHold) signal 510, 511, . . . , 525 hold 504 to generate PEi-Hold' signals 530, 531, . . . , 545. Each PEi-Xhold signal 510, 511, . . . , 525 is activated upon predecoding a PE Tstop instruction and deactivated when the SP hold' signal is deactivated. The SP-Hold' signal is released the cycle after all PEs have activated their PEi-DHold signals 550, 551, . . . , 565. An exemplary AND gate may be used to AND all PEi-Dhold signals 550, 551, . . . , 565 to generate a released SPHold signal 568.

A SP pause counter may be used that is snap shot whenever a PE completes its independent operations. In addition and as an example, a 4-bit flag may be sent by each PE to indicate a number of status conditions. The PE number, the 4-hit status flag, and the snap shot pause counter value may be stored in an SP local memory.

While the present invention has been disclosed in the context of various specific illustrative embodiments, it will be recognized that the invention may be suitably applied to other environments and applications consistent with the claims which follow.

We claim:

1. A method for executing very long instruction words (VLIWs) separately on individual processing elements (PEs), the method comprising:
receiving a thread start (Tstart) instruction from a first instruction path in each PE of a plurality of PEs;
switching in each PE from the first instruction path to a second instruction path in response to the Tstart instruction, wherein the first instruction path is used to receive single instruction multiple data (SIMD) instructions distributed to each PE and the second instruction path is used to receive instructions from a local PE instruction memory (PE Imem);
fetching a PE execute VLIW (PEXV) instruction from the local PE Imem in each PE;
selecting a VLIW having a plurality of slot instruction from a VLIW memory located in each PE in response to the PEXV instruction, to decode and execute the plurality of slot instructions in parallel in each PE;
executing a Tstop instruction fetched from the local PE Imem that is specified to execute a PE instruction in the shadow of the Tstop instruction; and
executing the PE instruction in the shadow of the Tstop instruction.

2. The method of claim 1, wherein the Tstop instruction identifies how many instructions are to be executed in the shadow of the Tstop instruction.

3. The method of claim 1, wherein the Tstop instruction indicates no instruction is to be executed in the shadow of the Tstop instruction.

4. The method of claim 1, wherein the PEXV instruction fetched in each PE is a different PEXV instruction, wherein each different PEXV is configured to cause a different VLIW operation in each PE.

5. An apparatus for parallel processing comprising:
a plurality of processing elements (PEs);
a local PE instruction memory (PE Imem) associated with each PE and containing local PE instructions for execution locally on the associated PE; and
a controller in each PE that is configured to receive single instruction multiple data (SIMD) instructions distributed in parallel to multiple PEs after initialization, to execute the received SIMD instructions in a SIMD mode, and to receive a distributed thread start (Tstart) instruction in each PE that causes the controller to directly switch from receiving the distributed SIMD instructions in the SIMD mode to fetching the local PE instructions from the associated local PE Imem at an address determined locally in each PE and executing the fetched local PE instructions in a multiple instruction multiple data (MIMD) mode, wherein the controller is configured to directly switch back to receiving the distributed SIMD instructions in response to determining a thread stop (Tstop) instruction has been received from the associated local PE Imem.

6. The apparatus of claim 5, wherein the thread stop instruction is encoded to execute a local PE instruction in the shadow of the thread stop instruction, the local PE instruction received from the associated local PE Imem.

7. The apparatus of claim 5, wherein the Tstop instruction identifies how many instructions are to be executed in the shadow of the Tstop instruction.

8. The apparatus of claim 5, wherein the address determined locally in each PE is based on a parameter passed by the Tstart instruction.

9. The apparatus of claim 5, wherein the Tstart instruction contains a thread block number that identifies a block of code in each associated local PE Imem to be executed locally on each PE.

10. The apparatus of claim 5 further comprising:
a control function instruction memory from which the SIMD instruction are fetched by a control processor for distribution to the plurality of PEs.

11. The apparatus of claim 5 further comprising:
a local very long instruction word (VLIW) memory (VIM) in each PE, wherein the local PE instructions include a PE execute VLIW (PEXV) instruction which when executed selects a VLIW from the VIM in each PE and wherein the selected VLIW is configured with a plurality of slot instruction which are executed in parallel in each PE.

12. A method for parallel processing, the method comprising:
distributing a first plurality of processing element (PE) instructions fetched from a controller memory to a first PE and to a second PE for single instruction multiple data (SIMD) execution on both the first PE and the second PE, wherein the first plurality of PE instructions includes a thread start (Tstart) instruction and the controller pauses fetching of PE instructions in response to identification of the Tstart instruction;
directly switching from receiving distributed instructions in a SIMD mode of operation to receiving first PE instructions fetched from a first PE instruction memory (PE Imem) in the first PE in a multiple instruction multiple data (MIMD) mode of operation in response to the Tstart instruction;
directly switching from receiving distributed instructions in the SIMD mode of operation to receiving second PE instructions fetched from a second PE Imem in the second PE in the MIMD mode of operation in response to the Tstart instruction; and
receiving a first thread stop (Tstop) instruction in the first PE from the first PE Imem and at a later time a second Tstop instruction in the second PE from the second PE Imem, wherein a first hold signal is asserted in the first PE in response to identifying the first Tstop instruction indicating the first PE has stopped fetching instructions from the first PE Imem and at the later time a second hold signal is asserted in the second PE in response to identifying the second Tstop instruction indicating the second PE has stopped fetching instructions from the second PE Imem, wherein the first PE and the second PE are directly switched from the MIMD mode back to the SIMD mode in response to reception of both the asserted first hold signal and the asserted second hold signal.

13. The method of claim 12 further comprising:
asserting a release hold signal based on receiving both the asserted first hold signal and the asserted second hold signal; and
distributing a second plurality of PE instructions fetched from the controller memory to the first PE and to the second PE in response to receiving the asserted release hold signal.

14. The method of claim 12 further comprising:
switching a first instruction path in the first PE in response to the first hold signal from receiving PE instructions fetched from the first PE Imem on the first PE to receiving distributed instructions.

15. The method of claim 12 further comprising:
switching a second instruction path in the second PE in response to the second hold signal from receiving PE instructions fetched from the second PE Imem on the second PE to receiving distributed instructions.

16. The method of claim 13 further comprising:
resuming in the controller the fetching of PE instructions from the controller memory in response to the asserted release hold signal.

17. The method of claim 12, further comprising:
ANDing the first hold signal with the second hold signal to generate the release hold signal.

18. The method of claim 12, wherein the controller is configured to operate the two PEs in SIMD mode when distributing a sequence of instructions to the two PEs and pauses SIMD control to allow the PEs to operate in a thread mode having a first thread operative on the first PE and a second thread operative on the second PE.

19. The method of claim 12, wherein the controller is configured to generate a controller hold signal to pause distributing instructions to the PEs in response to identifying the Tstart instruction in the controller.

20. The method of claim 12 further comprising:
taking a first snapshot of a controller pause counter in response to the asserted first hold signal to indicate a first duration of a pause associated with the first PE; and
taking a second snapshot of the controller pause counter in response to the asserted second hold signal to indicate a second duration of a pause associated with the second PE, wherein the first snapshot and an identification of the first PE and the second snapshot and an identification of the second PE are stored in the controller memory.

* * * * *